United States Patent
Webster et al.

(10) Patent No.: US 11,092,573 B2
(45) Date of Patent: Aug. 17, 2021

(54) APPARATUS, SYSTEMS, AND METHODS FOR DETERMINING NONLINEAR PROPERTIES OF A MATERIAL TO DETECT EARLY FATIGUE OR DAMAGE

(71) Applicant: Luna Innovations Incorporated, Roanoke, VA (US)

(72) Inventors: Matthew Ryan Webster, Charlottesville, VA (US); Kevin Farinholt, Stanardsville, VA (US); Gheorghe Bunget, Hazel, KY (US)

(73) Assignee: Luna Innovations Incorporated, Roanoke, VA (US)

( * ) Notice: Subject to any disclaimer, the term of this patent is extended or adjusted under 35 U.S.C. 154(b) by 370 days.

(21) Appl. No.: 16/009,255

(22) Filed: Jun. 15, 2018

(65) Prior Publication Data

US 2019/0004014 A1   Jan. 3, 2019

Related U.S. Application Data

(60) Provisional application No. 62/526,655, filed on Jun. 29, 2017.

(51) Int. Cl.
*G01N 29/44* (2006.01)
*G01N 29/12* (2006.01)
(Continued)

(52) U.S. Cl.
CPC ......... *G01N 29/4454* (2013.01); *G01N 29/12* (2013.01); *G01N 29/226* (2013.01);
(Continued)

(58) Field of Classification Search
None
See application file for complete search history.

(56) References Cited

U.S. PATENT DOCUMENTS

2015/0355358 A1* 12/2015 Aarre ................ E21B 7/00
  175/50
2015/0377836 A1* 12/2015 Lanza di Scalea .... G01N 29/11
  73/598

OTHER PUBLICATIONS

J.H. Cantrell, "Quantitative assessment of fatigue damage accumulation in wavy slip metals from acoustic harmonic generation" *Philosophical Magazine*, vol. 86, No. 11, Apr. 11, 2006, pp. 1539-1554.
(Continued)

*Primary Examiner* — Leslie J Evanisko
*Assistant Examiner* — Leo T Hinze
(74) *Attorney, Agent, or Firm* — Nixon & Vanderhye P.C.

(57) ABSTRACT

An inspection apparatus detects one or more characteristics of a material sample and includes a transmitter to transmit an initial signal to the material sample, and a receiver to receive a detected signal from the material sample associated with the initial signal. The detected signal has at least a first harmonic signal component and a second harmonic signal component. Data processing circuitry determines a resonant frequency of the first harmonic signal component and an amplitude of the first harmonic signal component at the resonant frequency, and filters the detected signal using a first filter signal having a frequency corresponding to the first harmonic signal component and a second filter signal having a frequency corresponding to the second harmonic signal component. A frequency analysis is performed in the frequency domain on the filtered first and second signals to determine corresponding first and second amplitudes. The first and second amplitudes may be compensated for nonlinearity. One or more nonlinear parameters are determined based on the first and second amplitudes. A user interface communicates one or more characteristics of the material sample based on the first and second compensated amplitudes.

19 Claims, 9 Drawing Sheets

(51) Int. Cl.
 *G01N 29/22* (2006.01)
 *G01N 29/42* (2006.01)

(52) U.S. Cl.
 CPC ......... *G01N 29/42* (2013.01); *G01N 29/4427* (2013.01); *G01N 2291/0258* (2013.01)

(56) References Cited

OTHER PUBLICATIONS

J.-Y. Kim et al, "Experimental characterization of fatigue damage in a nickel-base superalloy using nonlinear ultrasonic waves" *J. Acoust. Soc. Am.*, vol. 120, No. 3, Sep. 2006, pp. 1266-1273.

D.T. Zeitvogel et al, "Characterization of stress corrosion cracking in carbon steel using nonlinear Rayleigh surface waves" *NDT&E International*, vol. 62, Dec. 27, 2013, pp. 144-152.

* cited by examiner

APPARATUS, SYSTEMS, AND METHODS FOR DETERMINING NONLINEAR PROPERTIES OF A MATERIAL TO DETECT EARLY FATIGUE OR DAMAGE

RELATED APPLICATION

This application claims priority from U.S. provisional patent application No. 62/526,655, filed on Jun. 29, 2017, the contents of which are incorporated herein by reference.

GOVERNMENT RIGHTS

This invention was made with Government support under Contract No. W911QX_15_C_0024 awarded by the U.S. Army. The Government has certain rights to the invention.

BACKGROUND

Non-destructive testing (NDT) and non-destructive examination (NDE) are very important technologies. In the aerospace, construction, and oil & gas industries, for example, NDT and NDE technologies are needed for ensuring the safe operation of systems subjected to harsh mechanical and thermal environments over long periods of time. In the aerospace industry, both the risks and consequences of part failure are particularly high. As a result, operations and maintenance costs make up a large percentage of the lifetime cost of aircraft. Much of these costs are related to the manpower required for the inspections and preventative maintenance needed to reduce the risks of catastrophic failure during flight. Maintainers must ensure that fatigue and damage are identified during inspections and that components are replaced or repaired before failing during service.

Improvements in NDT and NDE technologies are desired to reduce cost, reduce size, improve ease of use, reduce complexity, reduce processing time and resources, and improve early detection of actual and potential fatigue and damage in materials.

SUMMARY

Example embodiments include an inspection apparatus for detecting one or more characteristics of a material sample. A transmitter transmits an initial signal to the material sample, and a receiver receives a detected signal from the material sample associated with the initial signal, the detected signal having at least a first harmonic signal component and a second harmonic signal component. Data processing circuitry determines a resonant frequency of the first harmonic signal component and an amplitude of the first harmonic signal component at the resonant frequency. The data processing circuitry filters the detected signal using a first filter signal having a frequency corresponding to the first harmonic signal to generate a filtered first detected signal and filters the detected signal using a second filter signal having a frequency corresponding to the second harmonic signal to generate a filtered second detected signal.

The data processing circuitry performs frequency analysis in a frequency domain on the filtered first detected signal and the filtered second detected signal to determine a first amplitude for the filtered first detected signal and a second amplitude for the filtered second detected signal. It determines a first nonlinear parameter based on the first amplitude and the second amplitude. The first nonlinear parameter includes damage information relating to the material sample. A user interface communicates information associated with the first nonlinear parameter which is representative of one or more characteristics of the material sample.

The transmitter may be a transmitting transducer, and the receiver may be a receiving transducer. Alternatively, the transmitter and receiver may be included in a single transducer.

In example applications, the initial signal is an ultrasonic signal and/or the inspection apparatus is portable and handheld in operation.

In example applications, the user interface includes one or more of a display, a wired connection, a wireless connection, and an alarm notification.

In example embodiments, the data processing circuitry is configured to filter the detected signal using the first filter signal and a cross-correlation in a time domain and to filter the detected signal using the second filter signal and the cross-correlation in the time domain.

In example embodiments, the frequency analysis includes taking a Fourier transform of the first and second filtered detected signals to transform the first filtered detected signal and the second filtered detected signal into the frequency domain from which the first amplitude and the second amplitude are respectively determined.

In example embodiments, the first filter signal includes a wavelet based on a sinusoid signal having a frequency corresponding to the first harmonic signal and the second filter signal includes a wavelet based on a sinusoid signal having a frequency corresponding to the second harmonic signal.

In example embodiments, the data processing circuitry compensates the first amplitude and the second amplitude for scaling resulting from cross-correlation filtering to produce a first compensated amplitude and a second compensated amplitude, and determines the first nonlinear parameter based on the first compensated amplitude and the second compensated amplitude. The first amplitude and the second amplitude may also be compensated using a normalization operation.

In example embodiments, the detected signal has a third harmonic signal component, and the data processing circuitry filters the detected signal using a third filter signal having a frequency corresponding to the third harmonic signal to generate a filtered third detected signal. The third filter signal includes a wavelet based on a sinusoid signal having a frequency corresponding to the third harmonic signal. The data processing circuitry performs frequency analysis in the frequency domain on the filtered third detected signal to determine a third amplitude for the filtered third signal. The data processing circuitry determines a second nonlinear parameter based on the first amplitude and the third amplitude. The second nonlinear parameter includes damage information relating to the material sample. The user interface communicates information associated with the second nonlinear parameter which is representative of one or more characteristics of the material sample.

In example embodiments, the data processing circuitry compensates the first amplitude, the second amplitude, and the third amplitude for scaling from cross-correlation filtering to produce a first compensated amplitude, a second compensated amplitude, and a third compensated amplitude. The data processing circuitry determines the first nonlinear parameter $\beta$ based on the first compensated amplitude and the second compensated amplitude and determines the second nonlinear parameter $\delta$ based on the first compensated amplitude and the third compensated amplitude.

In example embodiments, the first nonlinear parameter includes a second harmonic ratio of the second amplitude to the first amplitude squared and the second nonlinear parameter δ includes a third harmonic ratio of the third amplitude to the first amplitude cubed.

In example embodiments, the data processing circuitry determines a wave number of the detected signal and calculates the second harmonic ratio and the third harmonic ratio for the material sample further based on the wave number.

In example embodiments, the data processing circuitry stores in memory a material damage model of the second harmonic ratio and a material damage model of the third harmonic ratio for one or more material types for one or more material states, and compares values of the second harmonic ratio and the third harmonic ratio measured from the detected signal to classify an inspection state of the material sample.

In example embodiments, the one or more characteristics of the material sample includes a remaining useful life of the material sample.

Example embodiments also include a method for detecting one or more characteristics of a material sample, comprising:

transmitting an initial signal to the material sample;
receiving a detected signal from the material sample associated with the initial signal, the detected signal having at least a first harmonic signal component and a second harmonic signal component;
determining, using data processing circuitry, a resonant frequency of the first harmonic signal component and an amplitude of the first harmonic signal component at the resonant frequency;
filtering the detected signal using a first filter signal having a frequency corresponding to the first harmonic signal to generate a filtered first detected signal;
filtering the detected signal using a second filter signal having a frequency corresponding to the second harmonic signal to generate a filtered second detected signal;
performing, using the data processing circuitry, frequency analysis in a frequency domain on the filtered first detected signal and the filtered second detected signal to determine a first amplitude for the filtered first detected signal and a second amplitude for the filtered second detected signal;
determining, using data processing circuitry, a first nonlinear parameter based on the first amplitude and the second amplitude, wherein the first nonlinear parameter includes damage information relating to the material sample; and
communicating, via a user interface in communication with the data processing circuitry, information associated with the first nonlinear parameter which is representative of one or more characteristics of the material sample.

DETAILED DESCRIPTION

The following description sets forth example embodiments for purposes of explanation and not limitation. But it will be appreciated by those skilled in the art that other embodiments may be employed apart from these specific details. In some instances, detailed descriptions of well-known methods, interfaces, circuits, and devices are omitted so as not to obscure the description with unnecessary detail. Individual blocks are shown in some figures. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Software program instructions and data may be stored on a non-transitory, computer-readable storage medium, and when the instructions are executed by a computer or other suitable processor control, the computer or processor performs the functions associated with those instructions.

The term signal is used herein to encompass any signal that transfers information from one position or region to another in an electrical, electronic, electromagnetic, magnetic, or mechanical (e.g., ultrasonic signals) form. Signals may be conducted from one position or region to another by electrical or magnetic conductors, but the broad scope of signals also includes light and other electromagnetic forms of signals and other signals transferred through non-conductive regions due to electrical, electronic, electromagnetic, magnetic, or elastic effects. The broad category of signals includes both analog and digital signals: An analog electrical signal includes information in the form of a continuously variable physical quantity, such as voltage; a digital electrical signal includes information in the form of discrete values of a physical characteristic, which could also be, for example, voltage.

Unless the context indicates otherwise, the terms circuitry and circuit are used herein to refer to structures in which one or more electronic components have sufficient electrical connections to operate together or in a related manner. In some instances, an item of circuitry can include more than one circuit. An item of circuitry that includes a processor may sometimes be separated into hardware and software components; in this context, software refers to stored or transmitted data that controls operation of the processor or that is accessed by the processor while operating, and hardware refers to components that store, transmit, and operate on the data. Circuitry can be described based on its operation or other characteristics. For example, circuitry that performs control operations is sometimes referred to as control circuitry, and circuitry that performs processing operations is sometimes referred to as processing circuitry.

In general, sensors, processors, and other such items may be included in a system in which they are operated automatically or partially automatically. The term system refers to a combination of two or more parts or components that can perform an operation together. A system may be characterized by its operation.

Current technologies for damage inspection rely on the formation of cracks or defects in materials that occur at about the latter 80%-90% of the fatigue life. Therefore the maximum time period between inspections is about 10% of the lowest suspected fatigue life of any part in a system. In addition to requiring a short inspection interval, remaining useful life estimates based on crack length measurements can be inaccurate due to the unpredictable nature of late stage fatigue.

Measurement and determination of material characteristics (e.g., damage) may be performed through the analysis of the propagation and distortion of mechanical waves, e.g., ultrasonic waves. Industrial field inspections are typically performed using portable pulser-receiver units that deliver a spike of voltage to ultrasonic transducers and allow them to oscillate at their resonant frequencies producing a broadband pulse. Such units are used to make linear ultrasonic measurements based on wave velocity and signal attenuation that aim to locate flaws (e.g., cracks) and other macro-scale features in materials that are indicative of damage or weakness (damage is used as an encompassing term). Damage is located by analyzing the time between echoes of an ultrasonic pulse to determine the location of the nearest reflecting boundary, or by analyzing the attenuation of successive pulses as a metric for the amount of signal refraction occurring as the ultrasound is passed through the material. These measurements are done in the time domain.

Time-domain analyses suffer from limited resolution. Damage in a material can only be resolved in the time domain on the order of magnitude of the wavelength of the transmitted signal. In contrast, frequency domain analysis can reveal damage features orders of magnitude smaller than the signal wavelength. However, frequency analysis of broad-band ultrasonic pulses delivered by typical pulser-receiver units is difficult because the harmonics of a received signal are often masked by the fundamental component of the broad band pulse signal in addition to being low amplitude and distorted by noise and artifacts.

In the non-destructive examination (NDE) field, it can be useful to isolate narrowband frequency content from broadband data signals and/or to amplify specific content that may be orders of magnitude lower than more dominant signal components. For example, in nonlinear ultrasonic NDE, material damage is related to specific frequency components of ultrasonic waves used to inspect the material. Lattice dislocations and other microstructural damage mechanisms that precede crack initiation in fatigued materials influence the propagation of ultrasonic waves, causing distortion and nonlinearity that can be measured from an ultrasonic waveform passed through a material sample. The nonlinear response of the material, which correlates with the progression of damage, manifests itself as harmonics (i.e., multiples of the driving or fundamental frequency) in the frequency spectrum of the ultrasonic wave.

Unfortunately, the amplitudes of harmonics in the frequency spectrum of ultrasonic inspection signals are very small compared to the fundamental frequency and can be easily masked by the fundamental frequency and/or absorbed into background noise. To obtain sufficiently large harmonic amplitudes for damage detection in a material sample, high energy ultrasonic waves can be used, this means that signal amplifiers and other specialized instrumentation must be added to nonlinear ultrasonic measurement systems. This adds cost, size, weight, and complexity, all of which are obstacles to development of hand-held inspection units or otherwise field-deployable inspection systems.

The inventors realized a need for and developed technology to de-couple and detect narrowband, harmonic frequency components of a received broadband measurement signal using frequency spectrum analysis and processing (including amplification of low magnitude spectral components using wavelet decomposition) to improve resolution of ultrasonic inspection systems, and particularly in hand-held, field inspection units.

Technology is presented that filters, amplifies, and extracts specific frequency content from low amplitude, broadband signals to enable nonlinear ultrasonic measurement of material characteristics to be used in field inspection units. Nonlinear ultrasonic measurement units detect damage in components at less than about 20% of a material's fatigue life, which means that the time interval between inspections can be significantly increased without increasing risk of material failure.

In example embodiments, nonlinear ultrasonic harmonic generation technology is described that analyzes broad-band ultrasonic pulses sent through a material under test. A time domain ultrasonic signal, having passed through the material being inspected, is assessed in the frequency domain using a fast Fourier transform (FFT) to allow identification of the pulse's fundamental frequency and the amplitude of the fundamental frequency component. Higher harmonics of the time domain pulses are then determined by cross-correlation with one or more narrowband wavelets having frequencies that are multiples of the pulse's fundamental frequency. The output of each cross-correlation is a modulated version of the measured time domain ultrasonic signal which has been filtered to isolate specific frequency content. The cross-correlation waveforms are each analyzed in the frequency domain using an FFT to allow extraction of the amplitudes at each of the corresponding harmonic frequencies.

During both the frequency analysis of the received ultrasonic signal and the cross-correlation output waveform, the transformed signal may be windowed using a Hamming (or similar) window to eliminate lobes around the fundamental frequency (the first harmonic) that may mask or influence the measurement of higher harmonic content in the frequency domain. Filters (e.g., low-pass and/or high-pass filters) tuned to the frequency range of interest remove high or low frequency artifacts and other noise from the measurement system. The combination of filtering (e.g., hardware filtering in some example embodiments) and isolation of frequency content through cross-correlation (e.g., implemented using computer software in some example embodiments) permit extraction of nonlinear ultrasonic metrics from linear ultrasonic inspection units (e.g., portable units) to improve the detection of harmonics from signals transmitted through layered or complex material geometries in which multiple spectral components may interact.

Potential applications are wide ranging because the technology can be used for de-coupling any periodic signal (broadband or otherwise) from which specific frequency components are desired. For example, the technology may be applied to filter noisy data and/or amplify desired signal components in data. One non-limiting example application of the technology described here is in the field of non-destructive examination. The technology reduces the size, cost, and complexity of the instrumentation required for nonlinear ultrasonic inspections. In addition, the technology offers high accuracy and high resolution achievable with nonlinear ultrasonic analyses to be implemented with compact/portable inspection units.

Figure 1:
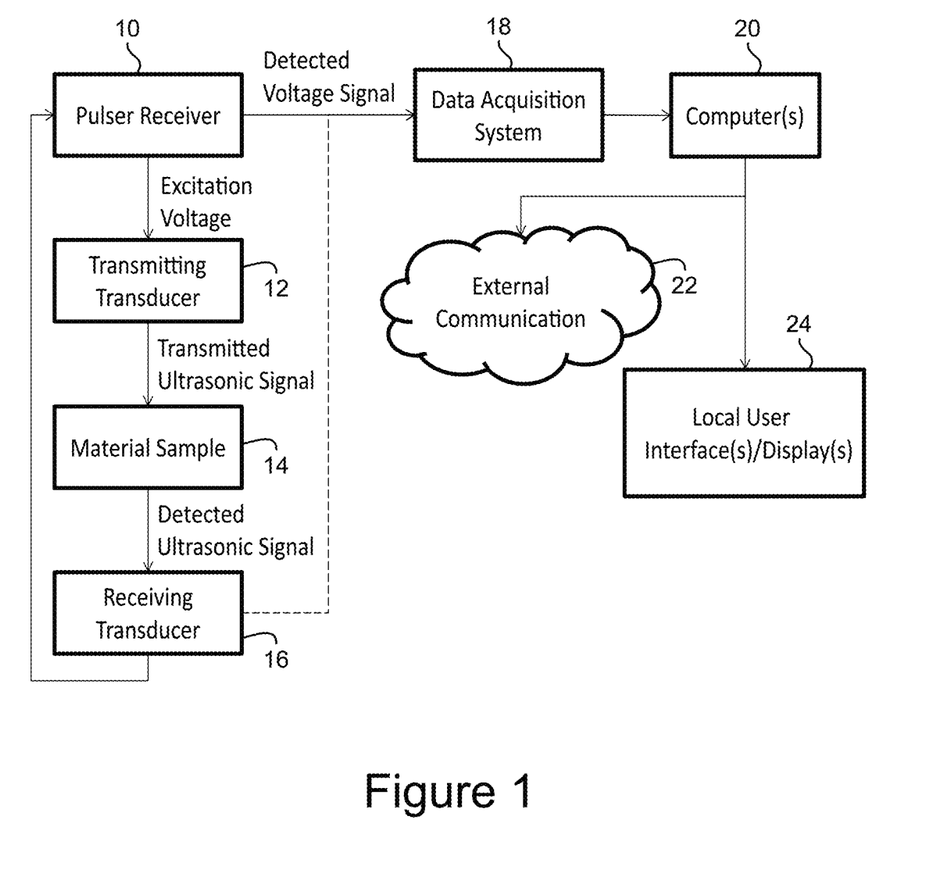
FIG. 1 shows a function block diagram for an example inspection system in accordance with an example embodiment.

FIG. 1 shows a function block diagram for an example inspection system in accordance with an example embodiment. An ultrasonic pulser-receiver 10 generates and provides an excitation voltage to a transmitting transducer 12 which generates and transmits an ultrasonic pulse to a material sample 14. The ultrasonic pulse passes through the material sample 14 and is detected by a receiving transducer 16, which provides the received signal corresponding to the detected pulse either directly to a data acquisition system 18 or indirectly by way of the pulser-receiver 10 as shown. The data acquisition system 18 communicates with one or more computers 20 that may be coupled to one or more external communication networks 22 and/or one or more local user interfaces/displays 24. The computer(s) 20 stores programs and/or include signal processing hardware (ASICs, PLAs, etc.) for analyzing the signals and reporting the results of that analysis using one or more of a display, a wired connection, a wireless connection, and an alarm notification. The details of that analysis are described below.

Figure 2:
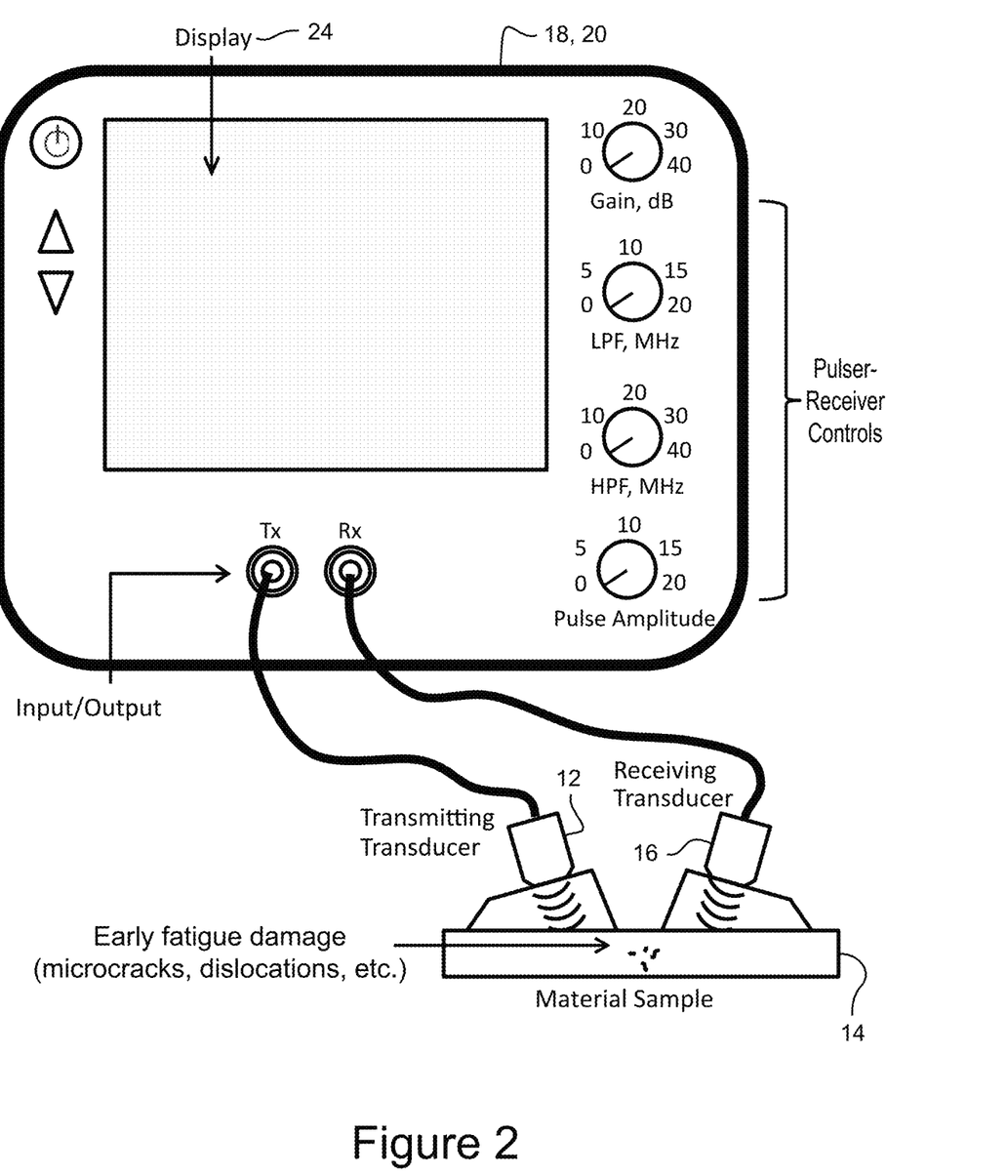
FIG. 2 shows an example hand-held inspection apparatus for conducting field inspections in accordance with an example embodiment.

FIG. 2 shows an example hand-held, portable inspection apparatus for conducting field inspections in accordance with an example embodiment. The example hand-held inspection apparatus includes a display 24, user controls in the form of buttons and knobs, and transducer Tx and Rx input/output terminals. The transducer Tx and Rx input/output terminals are connected to respective transmitting transducer 12 and receiving transducer 16 which are proximate to or in contact with a material under test 14, e.g., being inspected for fatigue damage such as microcracks, dislocations, etc.

Returning to FIG. 1, the transmitting transducer (Tx) 12 has a resonant frequency, f, and the receiving transducer (Rx) 16 is tuned with a resonant frequency at or near the second harmonic 2f of the transmitted ultrasonic pulse from the transmitting transducer (Tx) 12. Other example configurations may include a single transducer that both transmits the ultrasonic wave into the material 14 and receives the echo of the wave having passed through the material 14. In this single transducer embodiment, the single transducer may either be a single-element, broadband transducer capable of resolving both the fundamental frequency (f) (the fundamental frequency can be viewed as the first harmonic) and its harmonics 2f, 3f, 4f, ..., etc., or the single transducer may have multiple active elements, each tuned to a particular frequency of interest.

The pulser-receiver 10 delivers a spike in voltage that excites the transmitting transducer (Tx) 12 causing it to vibrate at its resonant frequency. In non-limiting example applications, e.g., aerospace applications, 25 W or more of excitation power may be delivered to excite nonlinear content in common alloys used for example in turbine blade manufacturing. For applications to multiple materials, the pulser-receiver 10 may provide an adjustable excitation voltage amplitude, energy level, and damping to reduce or minimize undesirable measurement system artifacts. As mentioned above, the pulser-receiver 10 may receive the received measurement signal from the receiving transducer 16 and may amplify and filter the received measurement signal before passing it to the data acquisition system 18.

The data acquisition system 18 inputs the received voltage signal and includes an analog to digital converter for converting the received analog signal to digital form and provides the digital data to memory, e.g., a USB device, for storage. The data acquisition system 18 in one non-limiting example can record data at a rate of about $10^8$ samples/sec, and samples each received signal waveform multiple times to enable averaging for improved signal-to-noise ratio.

From the data acquisition system 18, the computer(s) 20 receives digital data corresponding to the ultrasonic pulse from the pulser-receiver 10 or receiving transducer 16 and processes that received digital data to extract nonlinear parameters associated with the material sample 14 under inspection. In example embodiments, the nonlinear parameters extracted are a second harmonic ratio β and a third harmonic ratio δ defined as:

$$\beta = \frac{8A_2}{A_1^2 k^2 x}, \delta = \frac{24A_3}{A_1^3 k^3 x} \quad (1)$$

respectively, where $A_1$ is the amplitude of the fundamental component (first harmonic) of the received signal frequency spectrum, $A_2$ is the amplitude of the second harmonic, $A_3$ is the amplitude of the third harmonic, k is the wave number for the received signal, and x is the distance traveled by the ultrasonic signal through the specimen.

In other example embodiments, the expressions β and δ in equation (1) may be optionally modified by transfer functions $C_1$ and $C_2$, respectively, that correct for changes in, for example, acoustic attenuation and diffraction within the material that may influence the amplitude of harmonics measured from the received ultrasonic pulse.

$$\beta = \frac{8A_2}{A_1^2 k^2 x} \cdot C_1, \delta = \frac{24A_3}{A_1^3 k^3 x} \cdot C_2 \quad (2)$$

Such transfer functions like $C_1$ and $C_2$ help ensure repeatable measurements among materials that are identical in composition and damage state.

Figure 3:
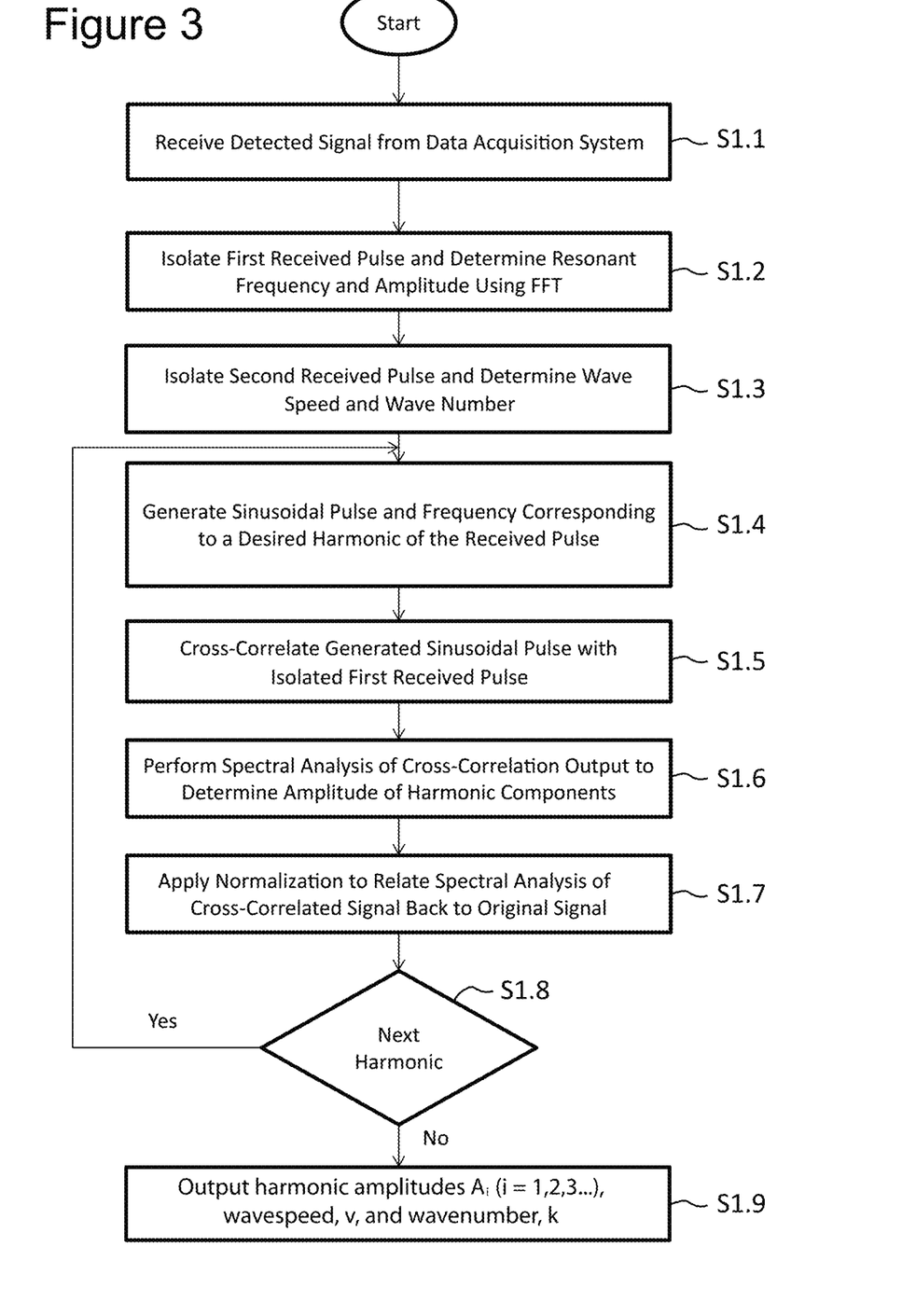
FIG. 3 is a flowchart of example operations to calculate harmonic amplitudes for use in determining nonlinear properties of a material to detect early fatigue or damage in accordance with an example embodiment.

FIG. 3 is a flowchart of example operations to calculate harmonic amplitudes for use in determining nonlinear properties of a material to detect early fatigue or damage in accordance with an example embodiment. The flowchart describes a process by which the harmonic amplitudes for the nonlinear parameters in equation (1) are determined from a received broadband ultrasonic signal.

Referring to FIG. 3, the received broadband ultrasonic signal is received in step S1.1 and optionally pre-processed to remove portions of the signal that are not needed for determining the material state and isolate the first received pulse. For example, through a user interface 24, the starting point of the signal's region of interest may be manually identified and points prior to the starting point are omitted. This step may also be performed automatically. In an embodiment where a single transducer acts as both the transmitter and receiver, the portion of the input signal corresponding to the initial reflection of the ultrasonic wave off the front surface of the sample can be omitted because the first front-wall echo typically does not have material state information having not passed through the material under test.

Figure 5:
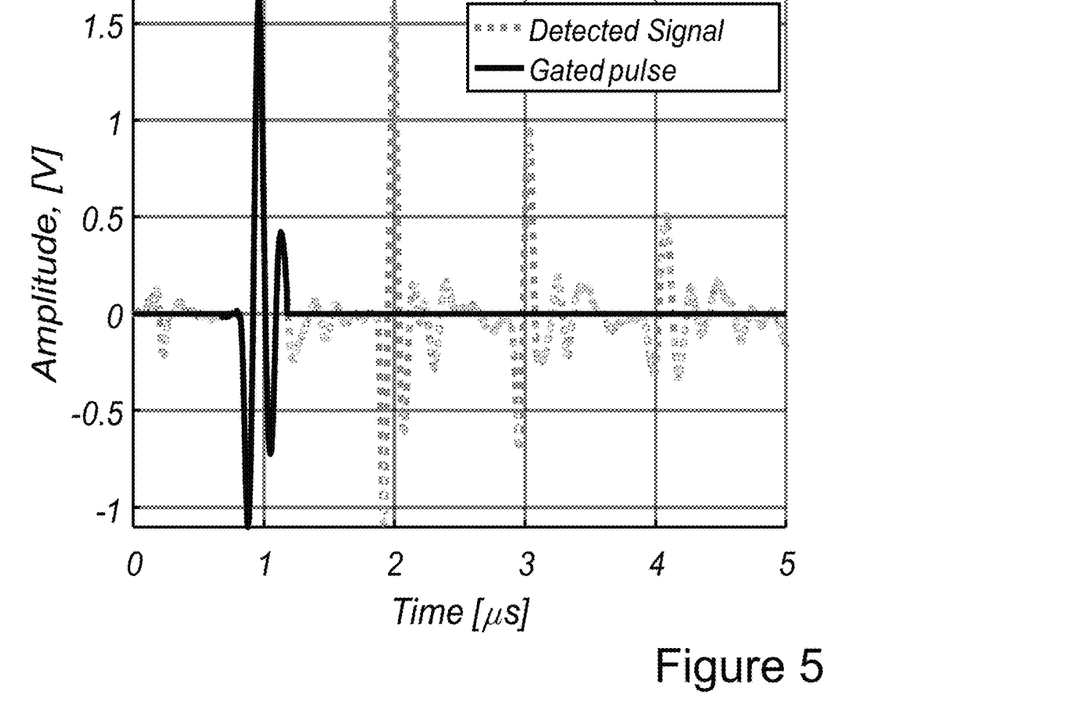
FIG. 5 is a graph showing a received signal waveform resulting from a transmitted ultrasonic pulse passing through a material under test.

Next, the received signal's frequency spectrum is analyzed to determine the resonant frequency and amplitude of its fundamental component in a first pulse (step S1.2). More specifically, the first pulse is identified by its maximum peak and a user-selected number of data points surrounding the peak (referred to as the gate size) are isolated, e.g., by windowing. Reference is made to FIG. 5, which is a graph showing a received signal waveform using a dotted line and a gated (isolated) first pulse of the received signal shown as a solid line.

Figure 6:
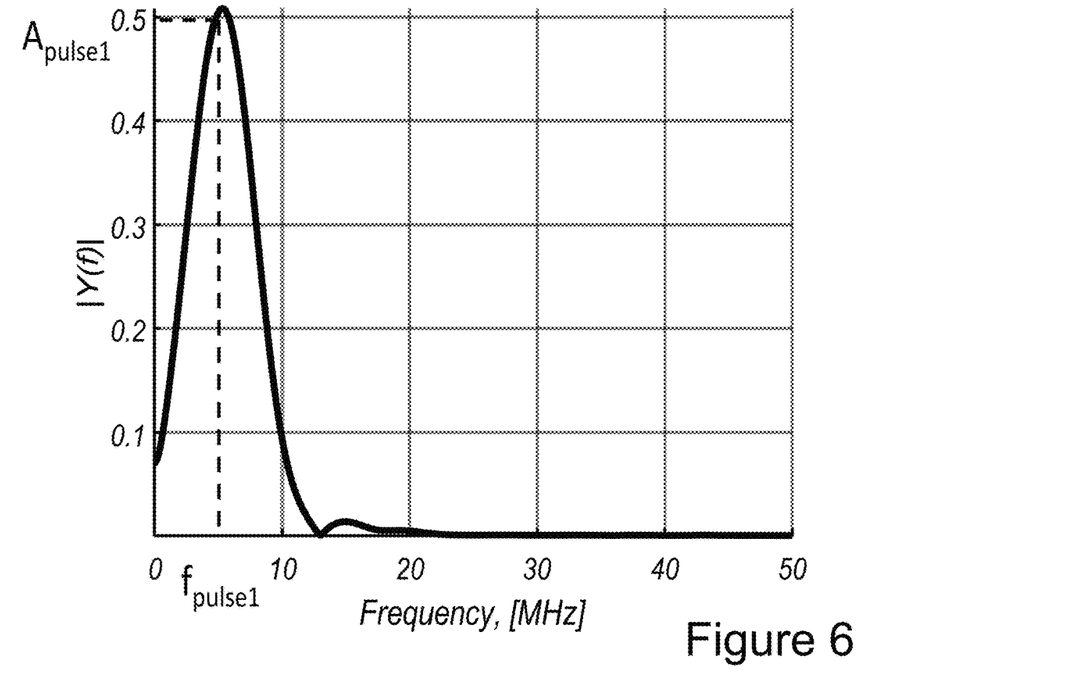
FIG. 6 a graph of a frequency spectrum of a gated pulse of the received signal waveform.

The isolated (gated) first pulse, $r_1(t)$, is processed to extract the frequency content. A fast Fourier transform (FFT) is performed on the isolated pulse to determine the magnitude, $A_{pulse1}$, and frequency, $f_{pulse}$, of the fundamental component of the pulse waveform. FIG. 6 is a graph showing an example of the magnitude, $A_{pulse1}$, and frequency, $f_{pulse}$, of the fundamental component of the pulse waveform. The frequency information from the first received pulse is stored in memory. The stored amplitude of the fundamental component of the received pulse, $A_{pulse1}$, may be used in example embodiments to normalize harmonic amplitudes calculated from cross-correlation waveforms for removing scaling that occurs during the cross-correlation process.

The second returned pulse to the receiving transducer then is isolated in order to determine the wave speed and wave number of the ultrasonic signal (step S1.3). The second pulse, $r_2(t)$, is isolated, e.g., in the same manner as the first pulse. An FFT is performed on the second isolated pulse to determine the amplitude $A_{pulse2}$. The frequency is, in general, equal to that obtained for the first pulse (i.e., $f_{pulse2}=f_{pulse1}=f_{pulse}$). This second returned pulse is used to calculate the wave speed and the wavenumber k. Specifically, the computer 20 is programmed to calculate the wave speed (phase velocity) v between successive peaks as:

$$v = x(t_2 - t_1) \quad (3)$$

where, $t_1$ is the time at which the peak of the first isolated pulse was received, $t_2$ is the time at which the peak of the second ultrasonic pulse was received, and x is the thickness of the material sample. The thickness may be measured using, for example, calipers or other thickness measurement tools. From the wave speed, the wave number k is then calculated by the computer 20 using:

$$k = \frac{2\pi f_{pulse}}{v}. \quad (4)$$

The computer 20 is also programmed to create simulated waveforms (called wavelets) used to amplify or identify the higher harmonic frequency content of received ultrasonic signals (step S1.4 in FIG. 3). Examples of the simulated first, second, and third harmonic waveforms (wavelets) are shown at 32A-32C in FIG. 7. In broadband ultrasonic pulses, higher harmonic content is masked by the dominant fundamental frequency component as explained previously and shown in the example graph in FIG. 6.

Figure 7:
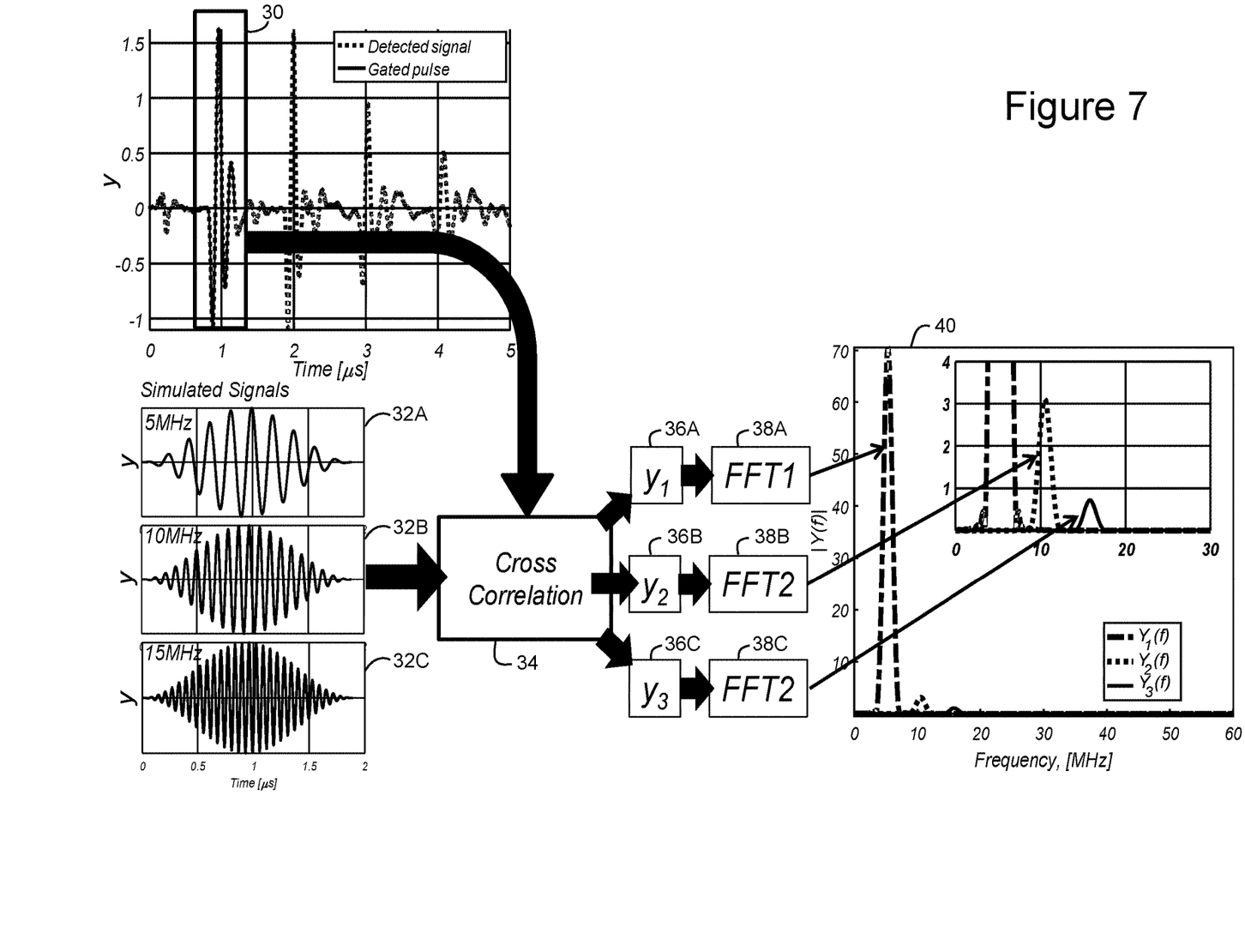
FIG. 7 is a diagram showing an example of a wavelet cross-correlation process in accordance with an example embodiment.

To de-couple a harmonic component from the fundamental frequency component, the computer 20 cross-correlates (e.g., using Wavelet Cross-Correlation (WCC)) the data corresponding to the received pulse shown at reference numeral 30 in FIG. 7 with data corresponding to a simulated pulse having a frequency of the desired harmonic, $f_{harmonic}$, see the example simulated pulse (a wavelet) having a frequency of the desired harmonic at 5 MHz at 32A in FIG. 7. See step S1.5 in FIG. 3. The correlation waveforms, shown as $y_1$, $y_2$, and $y_3$ at 36A-C in FIG. 7, that result from cross-correlation of the received pulse with the simulated first, second, and third harmonic simulated waveforms 32A-32C are shown in the time domain in FIG. 8 and in the frequency domain at 40 in FIG. 7 and separately in FIG. 9. The amplitude of the frequency spectrum of the resulting cross-correlation shown as $y_1$ at 36A in FIG. 7 is representative of how well the simulated signal (wavelet) matches the characteristics of the received signal and provides a metric for the amount of the harmonic frequency component, $f_{harmonic}$, is contained within the received signal.

In a more detail example embodiment, simulated, real-valued Morlet wavelets are created, each based on a pure sinusoid having a frequency corresponding to $f_{harmonic}$. For the ith harmonic, the base for the wavelet function is defined as:

$$x_i(t) = \sin(2\pi f_{harmonic} t) \quad (5)$$

The simulated waveforms are preferably multiplied by a Hanning window to eliminate erroneous side lobes in the frequency spectra so that the final form of the simulated wavelet functions are given by:

$$\psi_i(t) = \sin(2\pi f_{harmonic} t) \cdot \frac{1}{2}\left[1 - \cos\left(\frac{2\pi t}{N-1}\right)\right] \quad (6)$$

where N is the length of the first received pulse $r_1(t)$. A cross-correlation is performed between the isolated ultrasonic pulse, $r_1(t)$, and the simulated signal given in equation (6). The output of the cross-correlation $y_1$ is a waveform with the same frequency as the simulated pulse (i.e., the same frequency as the desired harmonic) and an amplitude that depends on how well the simulated signal matches the content of the isolated ultrasonic pulse. The cross-correlation of the ith harmonic component with the received pulse $r_1(t)$ is given as:

$$y_i(\tau) = \lim_{T \to \infty} \frac{1}{2T} \int_{-T}^{T} \psi_i(t) \cdot r_1(t+\tau) dt \quad (7)$$

where T is the time period over which the cross-correlation is performed.

Figure 8:
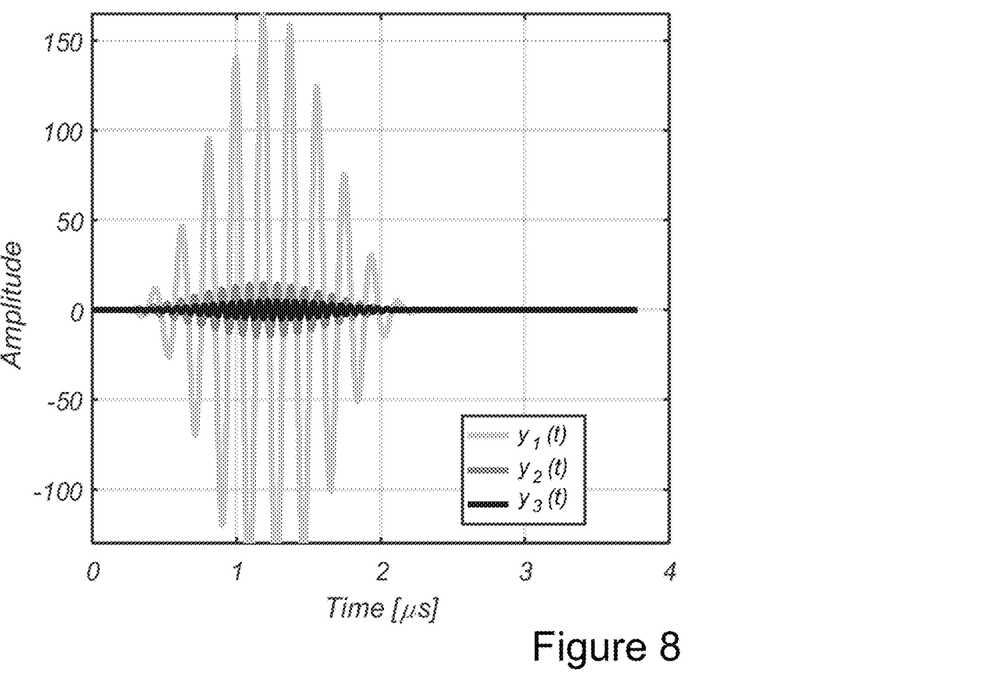
FIG. 8 is a graph showing example simulated first, second, and third harmonic waveforms in accordance with an example embodiment.

FIG. 7 shows the first, second and third simulated harmonic waveforms at 32A, 32B and 32C. The first harmonic (fundamental) frequency is 5 MHz, second harmonic frequency is 10 MHz, and the third example harmonic frequency is 15 MHz. FIG. 8 is a graph showing the example overlapping waveforms $y_1$, $y_2$, and $y_3$ generated from cross-correlation at 36A, 36B, and 36C of the isolated ultrasonic pulse with the simulated first, second, and third harmonic signals (wavelets) in FIG. 7.

The first, second, and third simulated harmonic waveforms (wavelets) 32A-32C are cross-correlated at 34 with the data corresponding to the received pulse shown at reference numeral 30 in FIG. 7 to produce resulting cross-correlation waveforms $y_1$ at 36A, $y_2$ at 36B, and $y_3$ at 36C shown in FIG. 8.

Figure 9:
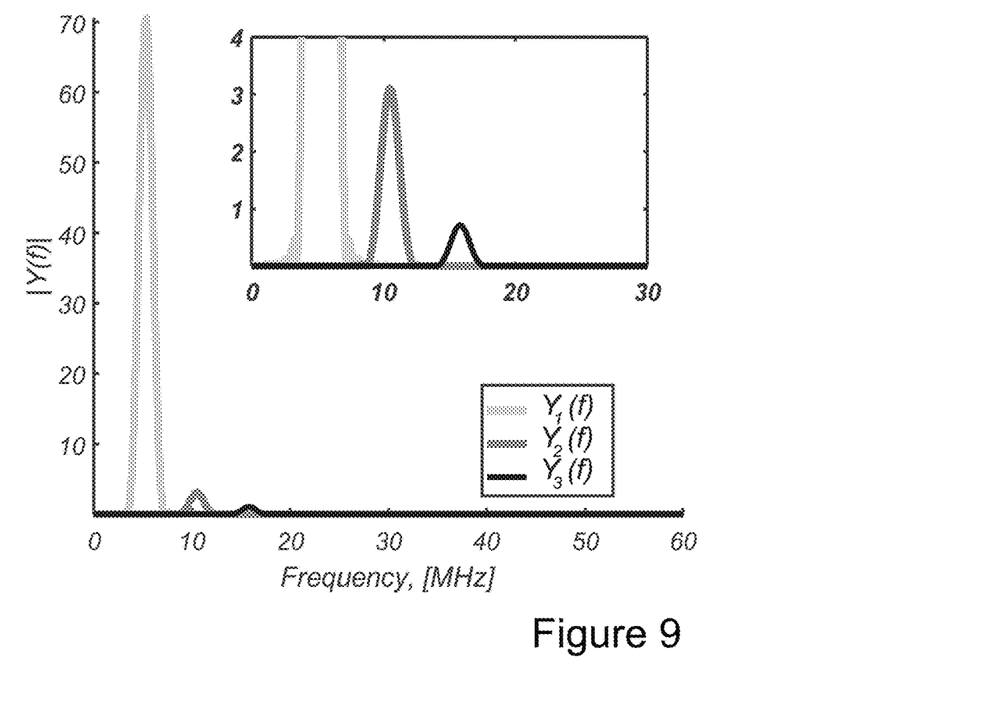
FIG. 9 is a graph showing example first, second, and third harmonics extracted in the frequency domain based on wavelet cross-correlation of the received signal with the simulated first, second, and third harmonic waveforms in accordance with an example embodiment.

FFTs performed at FFT1-FFT3 blocks 38A-38C extract the amplitude of each of the cross-correlations $y_1$-$y_3$ of the received pulse with the simulated first, second, and third harmonics in the frequency spectra. Examples of the first, second, and third harmonic cross-correlation amplitudes are shown in the graph at reference numeral 40 in FIG. 7 and separately in FIG. 9. The first, second, and third harmonic cross-correlation amplitudes are determined using:

$$\tilde{A}_i = \max[\text{FFT}(y_i(\tau))] \quad (8)$$

where max[X] represents the maximum value of a function X and FFT(Y) is the fast Fourier transform of a function Y. See step S1.6 in FIG. 3. FIG. 9 is a graph showing example first, second, and third harmonics extracted in the frequency domain $Y(f)_1$-$Y(f)_3$ of the wavelet cross-correlations $y_1$-$y_3$.

In optional example embodiments, the amplitudes, $\tilde{A}_i$, of the cross-correlation waveform, $y_i$, may be normalized in order to remove scaling induced in the cross-correlation process in step S1.5 as given by equation (7). See step S1.7 in FIG. 3. This step is useful because, although the harmonic amplitudes from the cross-correlated waveforms in equation (8) (see the example amplitudes in FIG. 9) are representative of how well the simulated signals match the original received pulse, the cross-correlation process represented in equation (7) introduces a dependency between the cross correlation amplitudes $\tilde{A}_i$ and the amplitude $A_{pulse}$ of the received signal. Because each of the cross-correlation amplitudes are similarly dependent on the pulse amplitude $A_{pulse}$, the values of the nonlinear parameters $\beta$ and $\delta$ using equation (1) vary with the amplitude of the pulse if the cross-correlation amplitudes are used directly as the harmonic amplitudes in equation (1). The amplitude of the received fundamental component can be influenced by external factors such as the mechanical coupling of the transducer 12 to the material sample 14. Dependence of the nonlinear parameters on the pulse amplitude is generally undesirable and is removed or significantly reduced through normalization of the cross-correlation amplitudes.

A relationship between the amplitude of the ith harmonic in the received signal ($A_i$) and the amplitude of the ith harmonic cross-correlation ($\tilde{A}_i$) that removes the scaling produced during the cross-correlation process is:

$$A_i = \tilde{A}_i / i A_{pulse1} \quad (9)$$

where, i=1 corresponds to the fundamental component of the frequency spectra, i=2 corresponds to the second harmonic, i=3 corresponds to the third harmonic component, and $A_{pulse}$ is the amplitude of the fundamental component of the isolated pulse from received signal.

Figure 10:
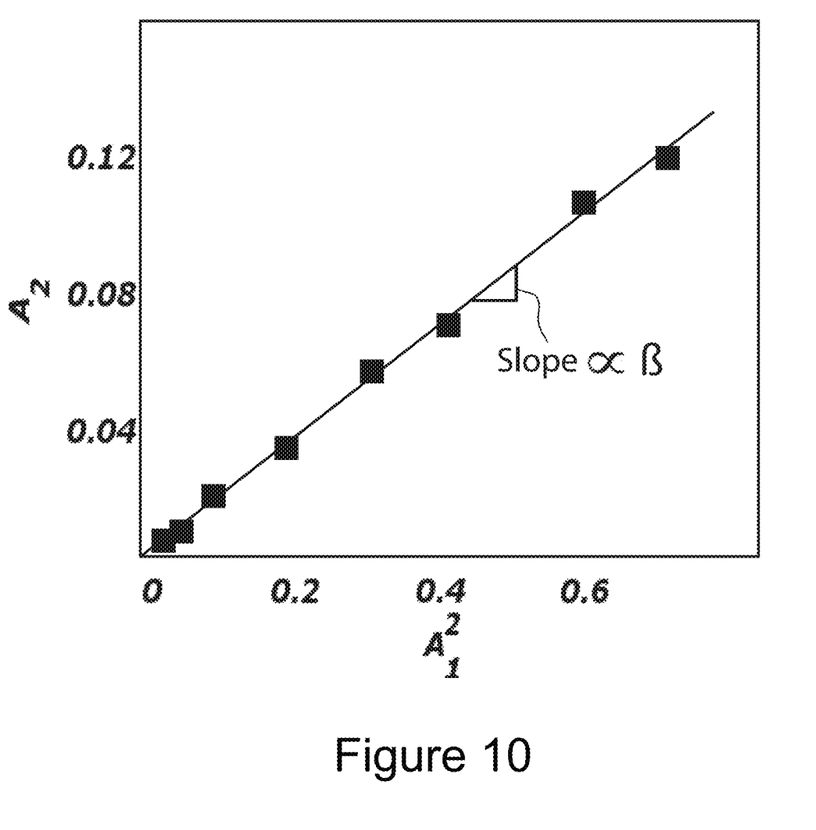
FIG. 10 is a graph showing an example of how correction coefficients provide linearity of inspection apparatus so that the nonlinear factor $A_2/A_1^2$ has a single slope β in accordance with a further example embodiment.

Using normalized cross-correlation amplitudes (as set forth in equation (9)) means that the nonlinear parameters $\beta$ and $\delta$ (as set forth in equation (1)) may be calculated without variations caused by fluctuations in the fundamental amplitude. The normalization process produces a linear relationship between the second harmonic amplitude $A_2$ and the squared first harmonic (fundamental) amplitude, $A_1^2$, as is shown in the plot of $A_2$ vs. $A_1^2$ shown in FIG. 10. The value of $\beta$ is proportional to the slope of the line of best fit for the $A_2$ vs. $A_1^2$ data. As depicted in FIG. 10, the value of $\beta$, as deduced from the slope of $A_2$ vs. $A_1^2$ is constant (i.e., linear) in spite of changes in the magnitude of the fundamental component, $A_1$, of the received waveform.

The normalization provided using equation (9) ensures linearity during measurements in which the ultrasonic transducer(s) is (are) placed in contact with the material under test (contact measurements). For non-contact measurements using, for example, ultrasonic immersion transducers or air-coupled transducers, other steps may be required to account for fluid attenuation or other confounding factors related to the experimental setup. However, such corrections may be applied in addition to the normalization described in equation (9) using, for example, the transfer functions $C_1$ and $C_2$.

The signal simulation, cross-correlation, and linearization operations are repeated by the computer for all harmonic frequencies of interest (see step S1.8). Upon completion of the final harmonic component, the computer is programmed to output the model parameters including in the example in FIG. 7, three harmonic amplitudes $A_1$, $A_2$, $A_3$, k (wave number), v (wave speed) for use in calculation of second and third harmonic ratios $\beta$ and $\delta$ as set forth in equation (1) (see step S1.9).

Figure 4:
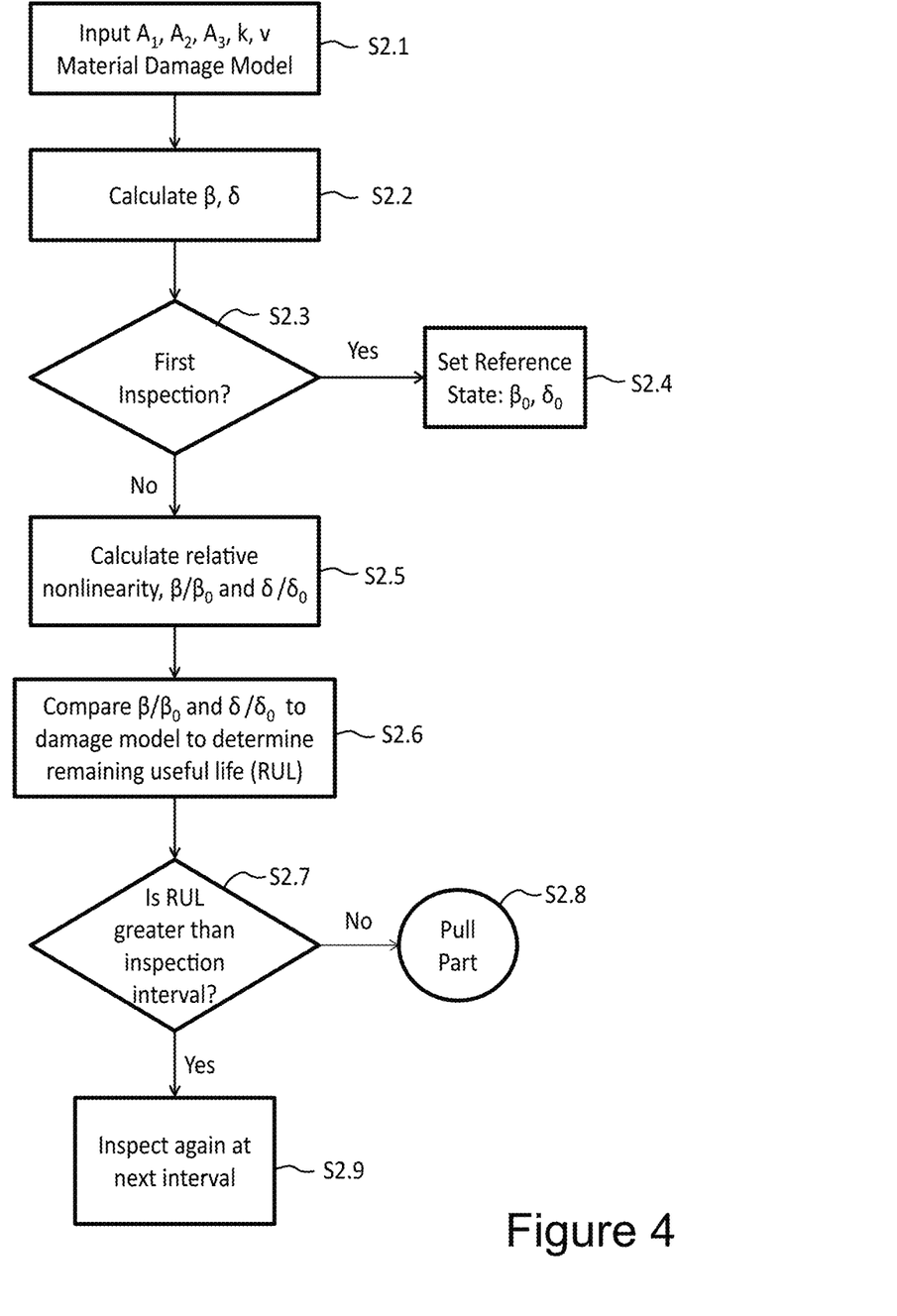
FIG. 4 is a flowchart of example operations of an inspection system using the nonlinear parameters generated in FIG. 3 in accordance with an example embodiment.

In example embodiments, the computer 20 calculates the harmonic amplitudes $A_i$ using equation (9) and the wave speed and wavenumber using equations (3)-(4) and shown in step S2.1 in FIG. 4. A material damage model, which is defined as a set of known values associated with the non-linear parameter at different material states (e.g., different damage states), may be derived from measurements on laboratory specimens of the same material type as the material sample but at controlled levels of damage. More than one material damage model may be stored such as material damage models for different materials and different damage types (states). For example, the memory may store a material damage model for material A undergoing fatigue damage, a material damage model for material B undergoing thermal damage, a material damage model for material B, undergoing fatigue, etc. That material damage model is also input at step S2.1 or may be otherwise stored in internal memory in the computer 20. At step S2.2, the computer 20 calculates the current nonlinear parameters $\beta$ and $\delta$ based on the input, and then at step S2.3, the computer 20 determines if the current measured values correspond to the first inspection of the material sample. If the current measured nonlinear parameters from step S2.2 are determined to be the first calculated for the material sample, then the computer 20 stores their values in memory as references $\beta_0$ and $\delta_0$. If, at the decision block in step S2.3, it is determined that the current inspection is not the first inspection, then the ratio of the current measured material damage model parameters $\beta$ and $\delta$ to the reference values $\beta_0$ and $\delta_0$ is calculated by the computer 20 as shown in step S2.5. In step S2.6, the ratios $\beta/\beta_0$ and $\delta/\delta_0$ are compared to the values in the stored material model (see step S2.1) to determine a remaining useful life (RUL) of the material sample. The RUL of the material sample is compared to an inspection interval predetermined for the material at step 2.7. If the material sample has less remaining life than required to last until the next inspection (i.e., RUL<the predetermined inspection interval), then the material sample is removed from service in step S2.8. Otherwise, if the RUL of the material sample is greater than the inspection interval, the material sample is left in service and is inspected at the next inspection interval in step S2.9.

In example embodiments, a user may receive the measured nonlinear parameters $\beta$ and $\delta$ as inspection results or indicators. In some example applications, such as the inspection of aircraft components, the measured nonlinear parameter values of β and/or δ provide an assessment of the current damage state of the material or component under test. These may be displayed either as a line plot of values over time or location, or as a two dimensional image showing the variations in β or δ in multiple directions. The latter example output is useful for identifying damage hotspots in components.

In example embodiments, and with respect to step S2.1, a database is formed from measurements made on materials having undergone controlled levels of damage to generate a material damage model (e.g., a lookup table) that relates β to the expended fatigue life of the material. That database may be stored in memory included with the computer(s) 20 or accessible by the computer(s) 20 locally or via communication network 22.

Figure 11:
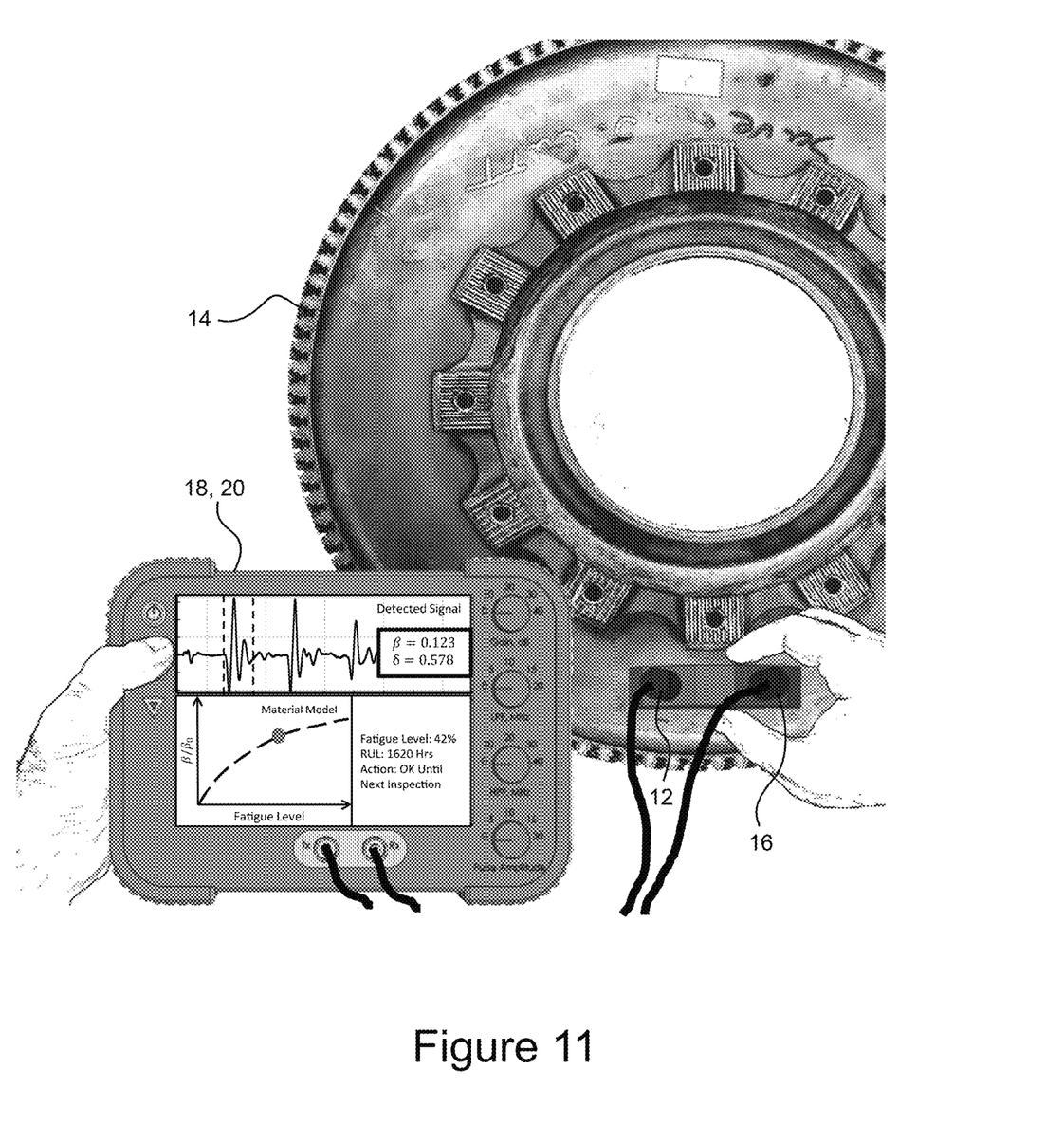
FIG. 11 shows an example of a hand-held, portable inspection apparatus in use in an example implementation.

In example embodiments, such a material damage model is used in field inspections made using a hand-held, portable inspection unit that includes the features shown in FIG. 1. An example hand-held, portable inspection device is shown in FIG. 11. As one example application, the example hand-held measurement system's computer, pulser-receiver, and data acquisition system may be is used to inspect a disassembled turbine disk in a maintenance depot environment. The transmitting transducer produces an ultrasonic wave that is transferred through the material by way of mechanical coupling to the surface and detected by the receiving transducer. The voltage reading from the receiving transducer is displayed as the detected or received signal on the display of the handheld unit. A user-selected region of the detected signal is isolated and used to calculate corresponding values of the nonlinear parameters β and δ. Based on the maintenance and inspection records for the specific component under test, here the disassembled turbine disk, the ratio of the current nonlinear parameters to the original (reference) parameters (i.e. $\beta/\beta_0$ and $\delta/\delta_0$) are compared to the material damage model for the base material of the inspected component that is stored in memory to determine the material's/component's remaining useful life.

Based on the intended use of the material, component, or structure, a trained inspector may make a judgment call about whether the component should be replaced or remain in service until the next inspection interval. The nonlinear parameters β and δ enable identification of damage and its propagation before 20% of the components useful life is expended. This is in contrast to known NDE techniques that cannot detect damage until nearly 80% of a component's useful life has been expended. In example embodiments, data over the entire life of the component is stored so that damage rates can be used in deciding whether or not to remove a part from service.

The technology described in this application offers many advantages. First, it de-couples frequencies of interest from a complex, broad-band ultrasonic signal. In doing so, it enables the use of low-power spike excitations of ultrasonic transducers during inspections as opposed to the high power narrowband tone bursts often used in laboratory-based measurements. As a result the described technology eliminates the need for high power amplifiers for generating large harmonics, reducing the instrumentation size, cost and complexity of systems like, but not limited to, nonlinear ultrasonic inspection systems. Second, it also improves the resolution and accuracy of measurements by eliminating interference between the fundamental driving frequency and its higher harmonics. Third, the optional transfer functions described above in equation (2) provide the ability to compensate for attenuation and dispersion, thereby expanding the applicability of the measurement system to complex materials.

The damage evaluation systems enabled by this technology can be used for example in commercial and government aerospace industries, in infrastructure and civil engineering, and in energy generation systems. The use of nonlinear ultrasonic metrics for evaluation of material characteristics enables the detection of damage, quality control for manufacturing, as well as the detection of corrosion and chemical leaching (de-alloying) that result in changes in microstructural composition of materials. As mentioned above, this technology provides low-power, low footprint, hand-held, portable systems for making nonlinear ultrasonic measurements. Low-power inspection systems may also be installed on structures in order to monitor those structures for damage over long periods of time.

Although various embodiments have been shown and described in detail, the claims are not limited to any particular embodiment or example. Moreover, example embodiments above use ultrasonic waves as an example. However, the technology may be applied to other types of signals including optical signals from fiber-optic measurement devices, acoustic signals in the audible range, and electromagnetic signals from eddy-current or other electromagnetic measurement methods utilizing alternating current or other periodic means of inspection.

None of the above description should be read as implying that any particular member, step, range, or function is essential. All structural and functional equivalents to the members of the above-described embodiments that are known to those of ordinary skill in the art are incorporated herein by reference and are intended to be encompassed. Furthermore, no embodiment, feature, component, or step in this specification is intended to be dedicated to the public.

The invention claimed is:

1. A hand-held, non-linear, ultrasonic inspection apparatus for detecting one or more characteristics of a material sample having microstructures, the material sample being a component of a system subjected to mechanical or thermal loading resulting in changes in the microstructure over a period of time caused by the system being exposed to a harsh mechanical environment and/or a harsh thermal environment over a period of time, comprising:
   a power source;
   a transmitter, powered by the power source, to transmit high amplitude, broadband ultrasonic signal to the component of the system having microstructural changes;
   a receiver, powered by the power source, to receive a detected broadband ultrasonic signal from the component of the system associated with the initial signal, the detected broadband ultrasonic signal having at least a first harmonic component and a second harmonic component;
   data processing circuitry, powered by the power source, to:
      determine a resonant frequency of the first harmonic component and an amplitude of the first harmonic component at the resonant frequency;
      correlate the detected broadband ultrasonic signal with a first simulated waveform signal having a frequency corresponding to the first harmonic component to generate a first harmonic signal;
      correlate the detected broadband ultrasonic signal with a second simulated waveform signal having a frequency corresponding to the second harmonic component to generate a second harmonic signal;

perform frequency analysis in a frequency domain on the first harmonic signal and the second harmonic signal to determine a first amplitude for the first harmonic signal and a second amplitude for the second harmonic signal;

determine a first nonlinear parameter based on the first amplitude and the second amplitude;

determine, based on the first nonlinear parameter, microstructural damage to the component of the system that precedes crack initiation in the component;

determine, based on the first nonlinear parameter, a remaining useful life of the component in the system; and a user interface, powered by the power source, to communicate information regarding the microstructural damage to the component and the remaining useful life of the component in the system for assessment as to whether the component should be replaced or remain in service until a next inspection of the component in the system.

2. The inspection apparatus in claim 1, wherein the transmitter is a transmitting transducer and the receiver is a receiving transducer.

3. The inspection apparatus in claim 1, wherein the data processing circuitry is configured to cross-correlate the detected broadband ultrasonic signal with the first simulated waveform signal in a time domain and to cross-correlate the detected broadband ultrasonic signal with the second simulated waveform signal in the time domain.

4. The inspection apparatus in claim 1, wherein the frequency analysis includes taking a Fourier transform of the first and second harmonic signals to transform the first harmonic signal and the second harmonic signal into the frequency domain from which the first amplitude and the second amplitude are respectively determined.

5. The inspection apparatus in claim 1, wherein the first simulated waveform signal includes a wavelet based on a sinusoid signal having a frequency corresponding to the first harmonic component and the second simulated waveform signal includes a wavelet based on a sinusoid signal having a frequency corresponding to the second harmonic component.

6. The inspection apparatus in claim 1, wherein the data processing circuitry is configured to:
compensate the first amplitude and the second amplitude for scaling resulting from cross-correlation to produce a first compensated amplitude and a second compensated amplitude, and
determine the first nonlinear parameter based on the first compensated amplitude and the second compensated amplitude.

7. The inspection apparatus in claim 6, wherein the data processing circuitry is configured to compensate the first amplitude and the second amplitude using a normalization operation.

8. The inspection apparatus in claim 1, wherein the detected broadband ultrasonic signal has a third harmonic component, the data processing circuitry is configured to:
correlate the detected broadband ultrasonic signal with a third simulated waveform signal having a frequency corresponding to the third harmonic component to generate a third harmonic signal, wherein the third simulated waveform signal includes a wavelet based on a sinusoid signal having a frequency corresponding to the third harmonic component;

perform frequency analysis in the frequency domain on the third harmonic signal to determine a third amplitude for the third harmonic signal; and determine a second nonlinear parameter based on the first amplitude and the third amplitude;

determine, based on the first and second nonlinear parameters, microstructural damage to the component of the system that precedes crack initiation in the component;

determine, based on the first and second nonlinear parameters, the remaining useful life of the component in the system, wherein the user interface is configured to communicate information regarding the microstructural damage to the component and the remaining useful life of the component in the system based on the first and second nonlinear parameters.

9. The inspection apparatus in claim 8, wherein the data processing circuitry is configured to:
compensate the first amplitude, the second amplitude, and the third amplitude for scaling from cross-correlation filtering to produce a first compensated amplitude, a second compensated amplitude, and a third compensated amplitude;
determine the first nonlinear parameter based on the first compensated amplitude and the second compensated amplitude; and
determine the second nonlinear parameter based on the first compensated amplitude and the third compensated amplitude.

10. The inspection apparatus in claim 8, wherein the first nonlinear parameter includes a second harmonic ratio of the second amplitude to the first amplitude squared and the second nonlinear parameter includes a third harmonic ratio of the third amplitude to the first amplitude cubed.

11. The inspection apparatus in claim 10, wherein the data processing circuitry is configured to:
determine a wave number of the detected broadband ultrasonic signal, and
calculate the second harmonic ratio and the third harmonic ratio for the material sample further based on the wave number.

12. The inspection apparatus in claim 11, wherein the data processing circuitry is configured to:
store in memory a material damage model of the second harmonic ratio and a material damage model of the third harmonic ratio for one or more material types for one or more material states, and
compare values of the second harmonic ratio and the third harmonic ratio measured from the detected broadband ultrasonic signal to classify an inspection state of the material sample.

13. A method for detecting one or more characteristics of a material sample having microstructures, the material sample being a component of a system subjected to mechanical or thermal loading resulting in changes in the microstructure over a period of time caused by the system being exposed to a harsh mechanical environment and/or a harsh thermal environment over a period of time, comprising:
transmitting, using a hand-held, power source-operated, non-linear ultrasonic inspection apparatus, a high amplitude, broadband ultrasonic signal to the component of the system having microstructural changes;
receiving, using the hand-held, power source-operated, non-linear ultrasonic inspection apparatus, a detected broadband ultrasonic signal from the material sample associated with the initial signal, the detected broadband ultrasonic signal having at least a first harmonic component and a second harmonic component;

determining, using data processing circuitry included in the hand-held, power source-operated, non-linear ultrasonic inspection apparatus, a resonant frequency of the first harmonic component and an amplitude of the first harmonic component at the resonant frequency;

correlating the detected broadband ultrasonic signal with a first simulated waveform signal having a frequency corresponding to the first harmonic component to generate a first harmonic signal;

correlating the detected broadband ultrasonic signal with a second simulated waveform signal having a frequency corresponding to the second harmonic component to generate a second harmonic signal;

performing, using the data processing circuitry, frequency analysis in a frequency domain on the first harmonic signal and the second harmonic signal to determine a first amplitude for the first harmonic signal and a second amplitude for the second harmonic signal;

determining, using data processing circuitry, a first nonlinear parameter based on the first amplitude and the second amplitude;

determining, based on the first nonlinear parameter, microstructural damage to the component of the system that precedes crack initiation in the component determining, based on the first nonlinear parameter, a remaining useful life of the component in the system; and communicating, via a user interface included in the hand-held, power source-operated, non-linear ultrasonic inspection apparatus and in communication with the data processing circuitry, information regarding the microstructural damage to the component and the remaining useful life of the component in the system for assessment as to whether the component should be replaced or remain in service until a next inspection of the component in the system.

14. The method in claim 13, wherein the correlating includes a cross-correlation in a time domain, and wherein the frequency analysis includes taking a Fourier transform of cross-correlation signals into the frequency domain from which the first amplitude and the second amplitude are determined.

15. The method in claim 13, further comprising:
using a normalization operation to compensate the first amplitude and the second amplitude for scaling resulting from cross-correlation filtering to produce a first compensated amplitude and a second compensated amplitude, and
determining the first nonlinear parameter based on the first compensated amplitude and the second compensated amplitude.

16. The method in claim 13, wherein the detected broadband ultrasonic signal has a third harmonic component, the method comprising:
correlating the detected broadband ultrasonic signal with a third simulated waveform signal having a frequency corresponding to the third harmonic component to generate a third harmonic signal, wherein the third harmonic signal includes a wavelet based on a sinusoid signal having a frequency corresponding to the third harmonic component;
performing frequency analysis in the frequency domain on the third harmonic signal to determine a third amplitude for the third harmonic signal;
determining a second nonlinear parameter based on the first amplitude and the third amplitude;
determining, based on the first and second nonlinear parameters, microstructural damage to the component of the system that precedes crack initiation in the component;
determining, based on the first and second nonlinear parameters, the remaining useful life of the component in the system; and
communicating, via the user interface, information regarding the microstructural damage to the component and the remaining useful life of the component in the system based on the first and second nonlinear parameters.

17. The method in claim 16, further comprising:
compensating the first amplitude, the second amplitude, and the third amplitude for scaling from cross-correlation filtering to produce a first compensated amplitude, a second compensated amplitude, and a third compensated amplitude;
determining the first nonlinear parameter based on the first compensated amplitude and the second compensated amplitude; and
determine the second nonlinear parameter based on the first compensated amplitude and the third compensated amplitude.

18. The method in claim 16, wherein the first nonlinear parameter includes a second harmonic ratio of the second amplitude to the first amplitude squared and the second nonlinear parameter includes a third harmonic ratio of the third amplitude to the first amplitude cubed.

19. The method in claim 18, further comprising:
storing in memory a material damage model of the second harmonic ratio and a material damage model of the third harmonic ratio for one or more material types for one or more material states, and
comparing values of the second harmonic ratio and the third harmonic ratio measured from the detected broadband ultrasonic signal to classify an inspection state of the material sample.

* * * * *